Figure 1:
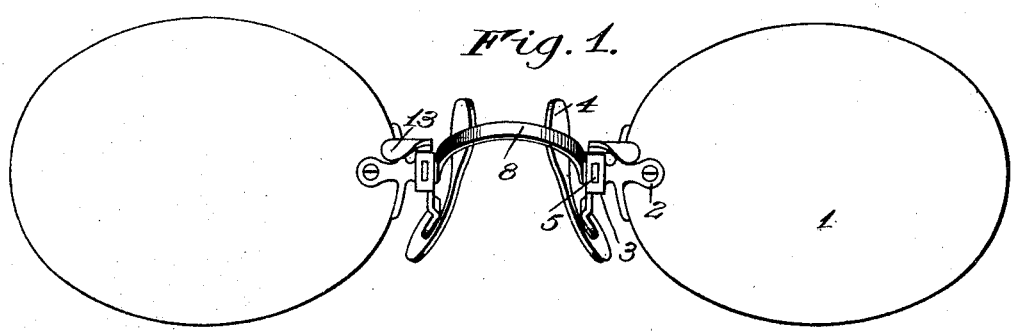

No. 862,432. PATENTED AUG. 6, 1907.
G. A. BADER.
EYEGLASSES.
APPLICATION FILED AUG. 29, 1906.

Witnesses
Walter B. Payne.

Inventor
Gustav A Bader
By his Attorneys

UNITED STATES PATENT OFFICE.

GUSTAV A. BADER, OF ROCHESTER, NEW YORK, ASSIGNOR TO E. KIRSTEIN SONS COMPANY, OF ROCHESTER, NEW YORK, A CORPORATION OF NEW YORK.

EYEGLASSES.

No. 862,432.   Specification of Letters Patent.   Patented Aug. 6, 1907.

Application filed August 29, 1906. Serial No. 332,432.

*To all whom it may concern:*

Be it known that I, GUSTAV A. BADER, of Rochester, in the county of Monroe and State of New York, have invented certain new and useful Improvements in Eyeglasses; and I do hereby declare the following to be a full, clear, and exact description of the same, reference being had to the accompanying drawings, forming a part of this specification, and to the reference numerals marked thereon.

My present invention relates to improvements in mountings for eyeglasses, and especially of the type wherein the nose guards are operated by a relative horizontal movement of the lenses in the plane thereof, and the object of the invention is to provide an improved mounting of this type wherein the lenses may be easily and conveniently operated by means of finger grips adapted to be grasped and operated by the wearer for producing the desired movements of the lenses and guards.

To these and other ends the invention consists of certain improvements and combinations of parts, all as will be hereinafter more fully explained, the novel features being pointed out in the claims at the end of the specification.

Figure 2:
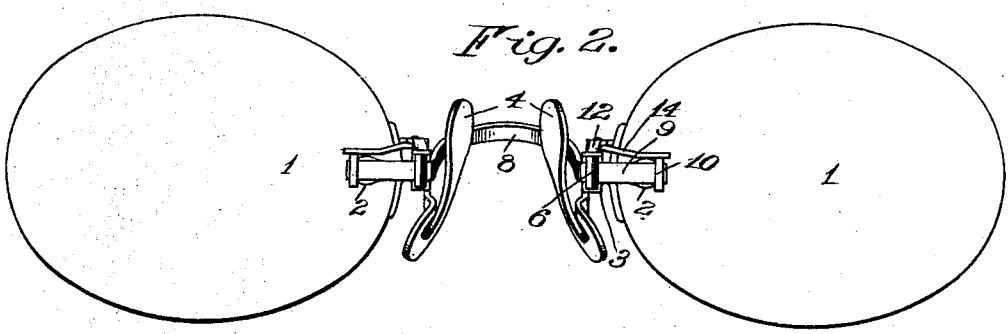
Figure 3:
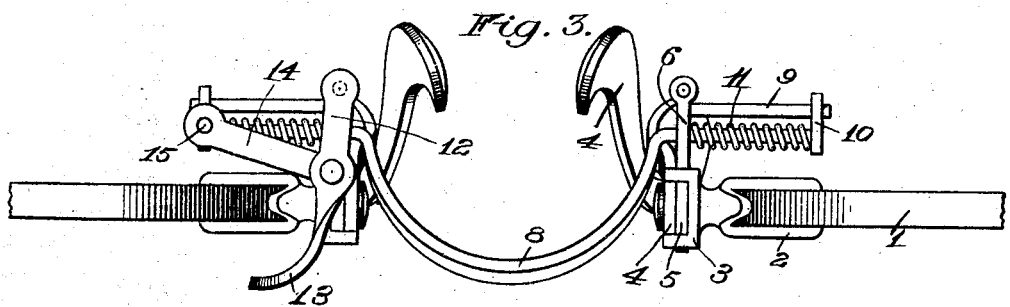
Figure 4:
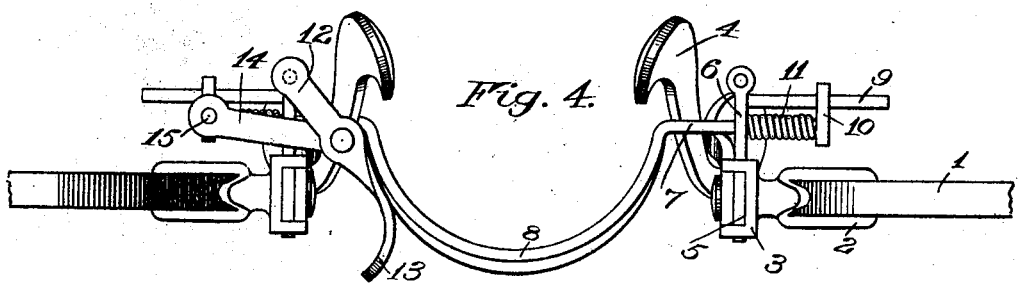

In the drawings: Figure 1 is a front elevation of a mounting for eyeglasses constructed in accordance with my invention. Fig. 2 represents a rear elevation of the mounting shown in Fig. 1, and Figs. 3 and 4 are plan views showing the relative arrangement of the parts when the nose guards are in open and closed positions respectively.

Similar reference numerals in the several figures indicate similar parts.

In wearing eyeglasses of the types wherein a relative movement or adjustment of the lenses serves to operate the nose guards, it is necessary to grip the lenses with the fingers, and this has proven objectionable in many instances because the surfaces of the lenses become soiled or cloudy so that the vision through the lenses is impaired. The present invention avoids this objectionable feature, by providing suitable finger grips adapted to be manipulated by the fingers of the wearer for effecting the necessary movements of the nose guards for applying and removing the eyeglasses.

The mounting shown in the present embodiment of the invention comprises generally, the lenses 1 provided at their inner or proximate edges with suitable attaching devices 2, the latter in the present instance each having a box 3 adapted to receive and secure the shank of the nose guards 4 and the attaching arm or lug 5 of the mounting proper. This arm supports a rearwardly-extending bearing 6 having an aperture therein to slidingly receive a guiding portion 7 of the bridge 8, the latter, in the present instance being composed of substantially rigid material formed into a bowed or arched central portion having its ends extending to the rear of the plane of the lenses and thence extending outwardly behind the corresponding lenses and in alinement with one another. The bearing 6 is attached to a slide 9, the latter extending in a direction parallel to the plane of the lenses, and being adapted to slide through a guiding aperture formed in a bearing lug 10 fixed to the outer end of the guiding portion of the bridge, a spring 11, preferably helical in form and coiled about the guiding portion on the bridge between the bearing lugs 6 and 10 respectively on the slide and bridge serving to return the nose guards to normal position after they have been separated. Toward the rear of the bearing 6 on each guard supporting slide is pivoted the rear end of an operating lever 12, the latter being suitably shaped to provide a finger grip 13 thereon conveniently accessible from the front of the lenses, and at intermediate points on these levers are pivotally connected the links 14, and the latter are connected at their outer ends to the bridge preferably by the projection 15 formed on the bearing lug 10.

In eyeglasses constructed in accordance with my present invention, it is unnecessary to grasp the lenses by the fingers in order to fit the eyeglasses to, or remove them from the nose, as the desired operation of the nose guards may be conveniently accomplished by means of the operating levers, the finger grips on the latter being pressed together by the fingers when it is desirable to separate the guards, and the springs confined between the bearing lugs of the bridge and slides respectively, serving to automatically engage the nose guards with the wearer's nose when the finger grips are released from the fingers.

A mounting of the kind shown provides a connection for the lenses that will prevent relative vertical tilting or rotation of the lenses, so that a mounting of this kind may be used in connection with cylindrical lenses prescribed for the correction of astigmatism, and the novel arrangement of the parts avoids a conspicuous appearance of the mounting as viewed from the front.

I claim as my invention:

1. In eyeglasses, the combination with the lenses, nose guards attached thereto, and a bridge having sliding connections with the lenses for permitting relative horizontal movement thereof, of finger grips movable relatively to the lenses for operating them to produce the desired movement of the nose guards.

2. In eyeglasses, the combination with the lenses, nose guards attached thereto, and a bridge having a sliding connection with the lenses for permitting relative separation of the lenses, of operating levers connected to the nose guards and having finger grips thereon by means of which the guards may be adjusted.

3. In eyeglasses, the combination with the lenses, and nose guards attached thereto, of a bridge having horizontally-extending guiding portions on its ends, sliding connections between the guiding portions on the bridge and the lenses, and operating levers connected to the lenses for operating them.

4. In eyeglasses, the combination with the lenses, and nose guards attached thereto, of a bridge having a sliding connection with the lenses, and an operating lever having operative connections between the bridge and a lens.

5. In eyeglasses, the combination with the lenses, nose guards attached thereto, and slides secured to the lenses, of a bridge having guiding portions thereon corresponding to said slides, bearing lugs arranged on the slides and the guiding portions of the bridge respectively, springs arranged between said bearing lugs and normally operating to proximate the nose guards, and finger grips operatively connected to the nose guards for operating them.

6. In eyeglasses, the combination with the lenses and nose guards, and a bridge having sliding connection with the lenses, of operating levers each connected respectively with the bridge and the lenses and having finger grips for operating them.

7. In eyeglasses, the combination with the lenses, attaching devices thereon having horizontally-extending slides secured thereto, nose guards attached to the lenses, a bridge having horizontal guiding portions thereon and bearings arranged on the slides and guiding portions of the bridge and forming a sliding connection between the latter and the lenses, of operating levers pivoted at their rear ends to the bearing on the slide and having finger grips formed on their forward ends, and links pivotally attached to the bearings on the bridge and connected to intermediate portions of the operating levers.

8. In eyeglasses, the combination with the lenses having suitable attaching devices at their proximate edges, nose guards connected to said attaching devices, and a bridge having a sliding connection with the lenses in substantially the same horizontal plane with the attaching devices, of finger grips operatively connected to the lenses and arranged in substantially the same horizontal plane with the attaching devices.

9. In eyeglasses, the combination with the lenses, nose guards, and a bridge having sliding connections with the lenses arranged substantially in the plane of the major axes of the lenses, of operating levers having suitable operating connections between the lenses and the bridge, said levers being arranged substantially in the same horizontal plane with the sliding connections.

GUSTAV A. BADER.

Witnesses:
G. WILLARD RICH,
WALTER B. PAYNE.